(12) United States Patent
Lee

(10) Patent No.: US 7,797,729 B2
(45) Date of Patent: *Sep. 14, 2010

(54) PRE-BOOT AUTHENTICATION SYSTEM

(75) Inventor: Shyh-Shin Lee, Taipei (TW)

(73) Assignee: O2Micro International Ltd., Georgetown (KY)

( * ) Notice: Subject to any disclaimer, the term of this patent is extended or adjusted under 35 U.S.C. 154(b) by 1208 days.

This patent is subject to a terminal disclaimer.

(21) Appl. No.: 11/220,345

(22) Filed: Sep. 6, 2005

(65) Prior Publication Data

US 2006/0010317 A1    Jan. 12, 2006

(51) Int. Cl.
*G06F 7/04* (2006.01)
*G06F 17/30* (2006.01)

(52) U.S. Cl. .................. 726/2; 713/100; 711/164; 709/221

(58) Field of Classification Search ............... 713/182, 713/100, 2; 726/2
See application file for complete search history.

(56) References Cited

U.S. PATENT DOCUMENTS

| | | |
|---|---|---|
| 3,754,148 A | 8/1973 | Nye |
| 4,090,089 A | 5/1978 | Morello et al. |
| 4,553,127 A | 11/1985 | Issa |
| 4,553,511 A | 11/1985 | Hayakawa et al. |
| 5,008,846 A | 4/1991 | Inoue |
| 5,019,996 A | 5/1991 | Lee |
| 5,023,591 A | 6/1991 | Edwards |
| 5,176,523 A | 1/1993 | Lai |
| 5,191,228 A | 3/1993 | Sloan |
| 5,396,635 A | 3/1995 | Fung |
| 5,498,486 A | 3/1996 | Gatehouse |
| 5,555,510 A | 9/1996 | Verseput et al. |
| 5,630,090 A | 5/1997 | Keehn et al. |
| 5,671,368 A | 9/1997 | Chan et al. |
| 5,710,930 A * | 1/1998 | Laney et al. ............ 713/300 |
| 5,716,221 A | 2/1998 | Kantner |
| 5,763,862 A | 6/1998 | Jachimowicz et al. |
| 5,768,627 A * | 6/1998 | Jones et al. ............ 710/60 |
| 5,809,312 A | 9/1998 | Ansel et al. |
| 5,835,594 A * | 11/1998 | Albrecht et al. ......... 713/187 |
| 5,844,986 A * | 12/1998 | Davis ..................... 713/187 |
| 5,878,264 A | 3/1999 | Ebrahim |
| 5,936,226 A | 8/1999 | Aucsmith |

(Continued)

FOREIGN PATENT DOCUMENTS

JP    06/312579    7/1996

(Continued)

OTHER PUBLICATIONS

NEC Technical Journal, Takashisa Shirakawa, Hiroyuki Yamaga, et al.; vol. 52, No. 7.

(Continued)

*Primary Examiner*—Farid Homayounmehr
(74) *Attorney, Agent, or Firm*—Wang Law Firm; Li K. Wang

(57) ABSTRACT

The invention provides a method for providing enhancements to a BIOS system without using replacement hardware in a microprocessor-based device. The microprocessor-based device boots from a BIOS procedure and interrupts the BIOS procedure to read information from an information module inserted to a information module reader connected to the microprocessor-based device. The information read from the information module is used to selectively alter the BIOS procedure.

9 Claims, 11 Drawing Sheets

U.S. PATENT DOCUMENTS

| | | | |
|---|---|---|---|
| 5,963,464 | A | 10/1999 | Dell et al. |
| 5,964,597 | A | 10/1999 | Hirata et al. |
| 5,975,959 | A | 11/1999 | Joly |
| 5,986,891 | A | 11/1999 | Sugimoto |
| 6,015,092 | A | 1/2000 | Postlewaite et al. |
| 6,085,327 | A | 7/2000 | Seng et al. |
| 6,199,120 | B1 | 3/2001 | Tanaka |
| 6,272,545 | B1 * | 8/2001 | Flanagin et al. ............ 709/228 |
| 6,275,933 | B1 | 8/2001 | Fine et al. |
| 6,353,885 | B1 | 3/2002 | Herzi et al. |
| 6,480,097 | B1 | 11/2002 | Zinsky et al. |
| 6,484,262 | B1 * | 11/2002 | Herzi ......................... 726/34 |
| 6,581,159 | B1 * | 6/2003 | Nevis et al. .................... 713/2 |
| 6,594,780 | B1 * | 7/2003 | Shen et al. .................... 714/15 |
| 6,618,810 | B1 * | 9/2003 | Dirie ........................ 726/27 |
| 6,625,730 | B1 * | 9/2003 | Angelo et al. ................. 713/2 |
| 6,633,981 | B1 * | 10/2003 | Davis ........................ 713/189 |
| 6,802,022 | B1 * | 10/2004 | Olson ........................... 714/6 |
| 6,986,034 | B2 * | 1/2006 | Tyner et al. .................... 713/2 |
| 7,000,249 | B2 * | 2/2006 | Lee ............................ 726/20 |
| 7,237,104 | B2 * | 6/2007 | Philyaw ........................ 713/1 |
| 7,421,688 | B1 * | 9/2008 | Righi et al. .................. 717/172 |
| 7,590,836 | B1 * | 9/2009 | Holmberg et al. ............... 713/1 |
| 7,590,837 | B2 * | 9/2009 | Bhansali et al. ................ 713/2 |
| 7,698,546 | B2 * | 4/2010 | Stemen ......................... 713/2 |
| 2001/0047472 | A1 * | 11/2001 | Huntington et al. ............ 713/2 |
| 2001/0052069 | A1 | 12/2001 | Sekiguchi |
| 2002/0078372 | A1 | 6/2002 | Aluzzo et al. |
| 2002/0087877 | A1 | 7/2002 | Grawrock |
| 2002/0169978 | A1 | 11/2002 | Kim et al. |
| 2002/0174353 | A1 * | 11/2002 | Lee ............................ 713/193 |
| 2003/0196100 | A1 | 10/2003 | Grawrock et al. |
| 2005/0246512 | A1 * | 11/2005 | Inoue ........................ 711/164 |

FOREIGN PATENT DOCUMENTS

| | | |
|---|---|---|
| JP | 09-091236 | 4/1997 |
| JP | 11/016461 | 4/2000 |
| JP | 10/347037 | 6/2000 |
| JP | 2000-172361 | 6/2000 |
| JP | 11/104409 | 10/2000 |
| JP | 2001-356913 | 12/2001 |
| JP | 2000346811 | 5/2002 |
| JP | 2002-341947 | 11/2002 |
| WO | 9317388 | 9/1993 |
| WO | 0016179 | 3/2000 |

OTHER PUBLICATIONS

Nikkei Computer, Published Sep. 27, 1999.
Fryer, et al. Microsoft Press Computer Dictionary, 1997, Microsoft Corporation, 3rd Edition, p. 281.

* cited by examiner

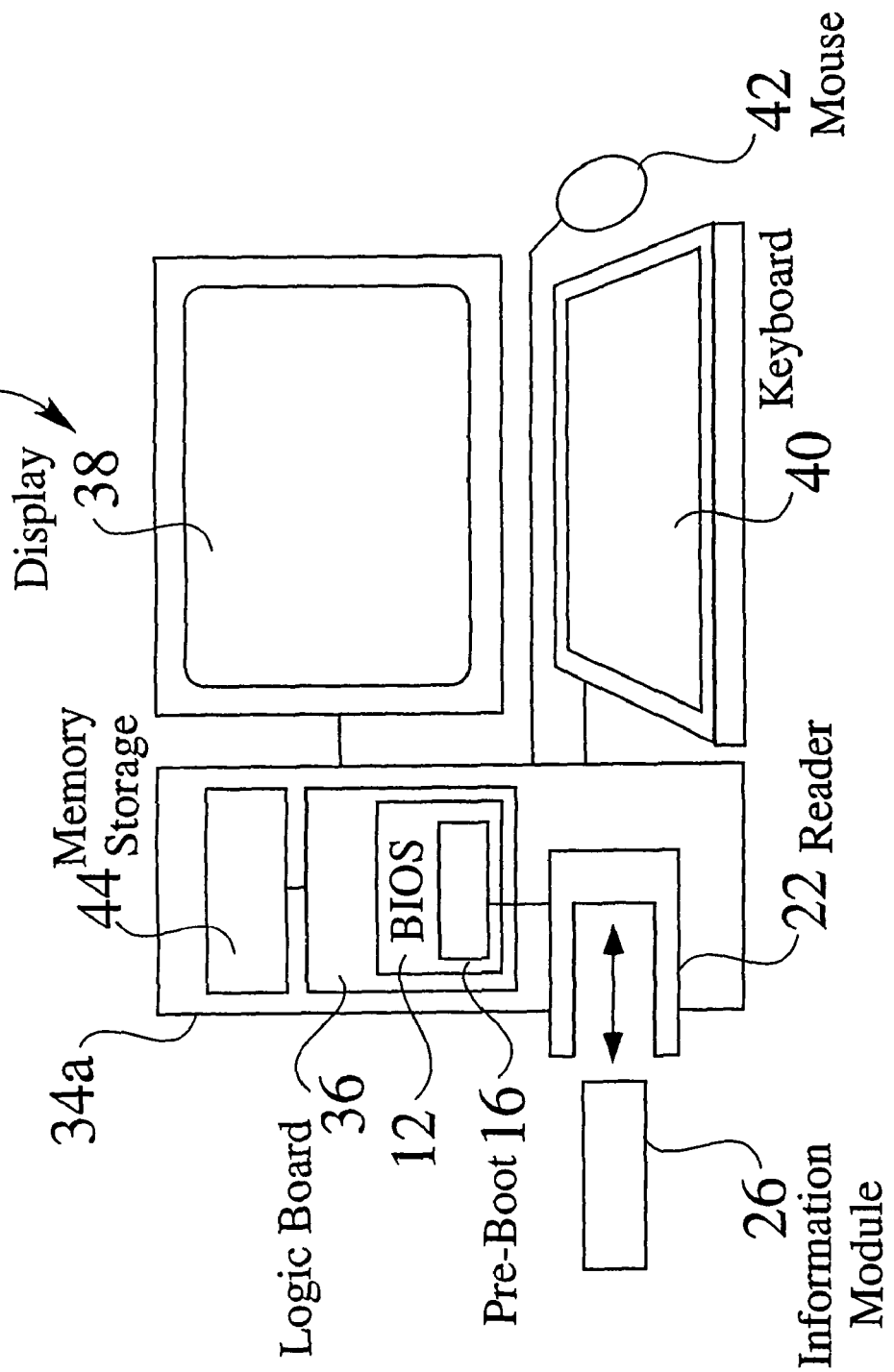

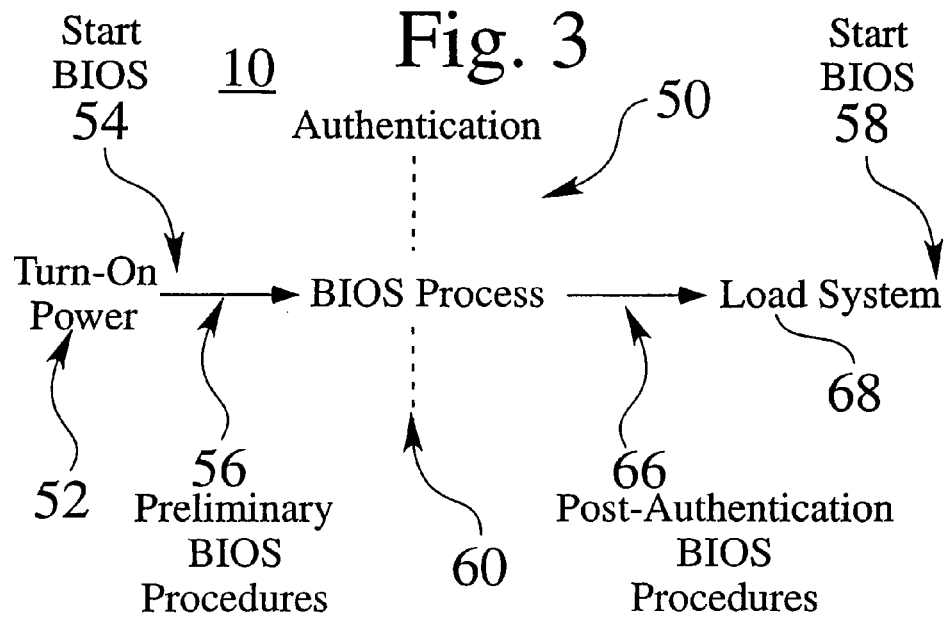
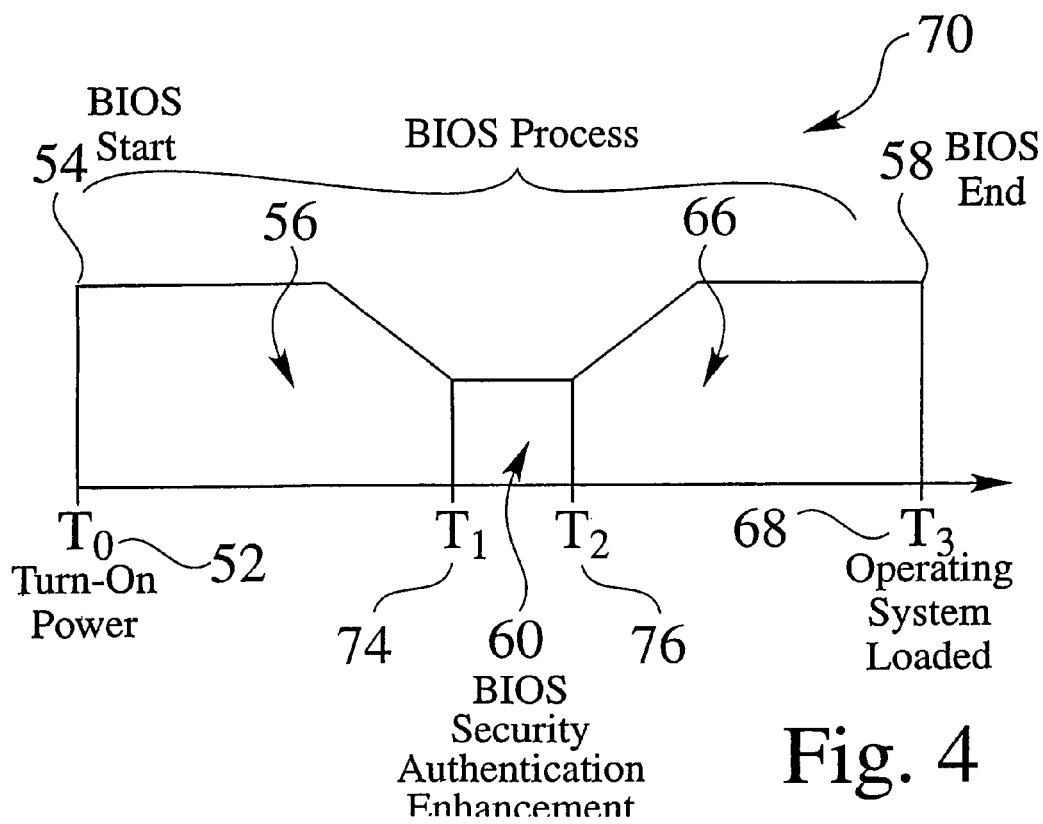

```
//Variable Declaration
BYTE CardState
BYTE Buf[256]
WORD BufLen = size of (Buf)

//Initialize the SmartCardBus Reader
//Assume use ox3e) and )x3e1 as I/O Port for card bus controller
base
//     use 0x300-0x31F as I/O Port for SmartCard Reader
//     use 0xD000-0xD7ff as memory map for SmartCard Reader
//     use socket B
//     use default cardbus controller device id: 0x69331217
If( O2SCRInital ( 0xD000, )x300, 1, 0 ) != 0 )
    Return: //Failed //Checking for card insertion or present
If( O2SCRGetCardState (&CardState) != 0 )
    returned; //Failed //Power on the card and get ATR back
BufLen = sizeof (Buf);
If( O2SCRCardPowerOn ( Buf, &BufLen) != 0 )
    returned; //Failed //Application Specific Codes
//For Example: may analysis the ATR in the Buf with //Data exchange with the card
//Assume the command already set in the Buf and BufLen equal
//to the command length
if( O2SCRExchange (Buf, &BufLen) !=0 )
    return; //Failed //Application specific codes...
//For example: Check the response back from the card
//in the Buf //Turn off the power to the card
O2SCRCardPowerOff();

//Release the resource
O2SCRelease ();
```

Fig. 6

WORD O2SCRInitial ( IN DWORD MemWinStartAddr, IN WORD IOPortAddr, IN BYTE Socket, IN WORD dev_id)
Parameters: MemWinStart Addr: Specify memory window starting address.
IOPortAddr: Specify I/O Port starting address.
        Socket: SmartCard Reader location. 0 :SocketA, 1:Socket B
         Dev_id: Specify the cardbus controller Device ID
          or 0:using default 0x6933. Note: Vendor ID always is 1217.
Comments: Specify the I/O Port Address will be used
by the O2 Card Bus Controller.
O2 card Bus Controller – Enable Memory and I/O registers.
Initial SmartCard Reader – Reset the Reader.
Turn on the socket power.
Note 1: The lengths of memory window are 4K and I/O port are 0x1F
Note 2 Before calling the function, Card Bus Controller PCI configuration register 0x44 should set to 0X3E1.

Return: 0: Successful. 1: Failed.

WORD O2SetReader( IN BYTE protos, IN BYTE IN, IN DWORD cwt, IN DWORD bwt)
Parameters: IN protos: protocol setting. ( SCARD_PROTOCOL_To or
         SCARD_PROTOCOL_T1).
        IN N: Extra Guard Time.
        IN cwt: character waiting time (T=0, T=1)
        In bwt: block waiting time(T=1).
Comments: Set preferred protocol. Must be called before O2SCRExchange().
        Default protocol is T=0 without calling this function.

Return: 0: Successful. 1: Failed.

**WORD O2SCRGetCardState ( OUT BYTE * CardState)**
IOPortAddr, IN BYTE Socket, IN WORD dev_id)
Parameters: CardState: 0 Absent, 1:Present.
Comments: get SmartCard insertion/extraction status.

Return: 0: Successful. 1: Failed

**WORD O2SCRCardPowerOn ( OUT BYTE\* pAtrBuf, In OUT WORD\* pAtrBufLen)**
Parameters: pAtrBuf: buffer to hold the ATR back from the card after power on.
IN pAtrVufLen: ATR length.
OUT pAtrBufLen: ATR length.
Comments: Turn on the SmartCard power and get
ATR (answer to Reset) string back. 78
 The pAtrBuf should be a valid pointer that specified by caller.
Return: 0: Successful. 1: Failed. 2:AtrBuf too small.

Fig. 10

**WORD O2SCRExchange (IN OUT BYTE \* pBuf, IN OUT WORD \* pBufLen)**
Parameters: IN pBuf: hold the command that will send to the card.
    IN pBufLen: command length in pBuf.
    OUT pBuf: hold the response from the card.
    OUT pBufLen: response length in pBuf.   80
Comments: Exchange data with the card.
Return: 0: Successful. 1: Failed.

Fig. 11

VOID O2SCRCardPowerOff (VOID)
Parameters: Not Applicable.
Comments: Turn off the SmartCard power.   82
Return: Not Applicable.

Fig. 12

VOID O2SCRelease (VOID);
Parameters: Not Applicable
Comments: Turn Off the socket power.   84
    Disable Memory and I/O registers used by reader
Return: Not Applicable

Fig. 13

BIOS CALL Specification for Pre-Boot System

File Desription
    IOSCR.INC - header File.
    O2SCR.BIN - Binary File
Start Address and Signature:
    SIGNATURE BYTE "O2SC" ; Offset 4 bytes Functions Description:
Input:
    AL = Function Number
Output:
    AX = 0h if succeed
         1h if failed O2SCRInitial
    AL = 1h
    EBX = memWin StartAddr (32 bits far Pointer)
    CX = IOPort Addr
    AH = Socket
    DX = dev_id O2SCRRelease
    AL = 2h O2SCRGetCardState
    AL = 3h
    BX = CardState O2SCRCardPowerOn
    AL = 4h
    EBX = pAtrBuf (32 Bits Far Pointer)
    ECX = pAtrBufLen (32 Bits Far Pointer)

O2SCRCardPowerOff
    AL = 5h

O2SCRExchange
    AL = 6h
    EBX = pBuf (32 Bits Far Pointer)
    ECX = pBufLen (32 Bits Far Pointer)

O2SetReader
    AL = 7h
    AH = protos
    BL = N
    ECX = cwt
    EDX = bwt

Example Usage:

INCLUDE io2scr.h

;O2SetReader( IN BYTE protos, IN BYTE N, IN DWORD cwt, IN DWORD bwt);
;O2SetReader ( SCARD_PROTOCOL_T1, 0, O2bh, 0457Ch )
    MOV AL, IO2SetReader ; EQ 7h which defined in io2scr.h
    MOV AH, SCARD_PROTOCOL_T1 ; EQ 2h which defined in io2scr.h
    MOV BL, 0    ;N
    MOV ECX 002bH    ; cwt
    MOV EDX 04757cH    ; bwt
    Call    xxxx    ; O2SCR.BIN Starting Address + 4

PRE-BOOT AUTHENTICATION SYSTEM

CROSS-REFERENCE TO RELATED APPLICATION

This application claims the benefit of U.S. patent application Ser. No. 09/860,709, Pre-Boot Authentication System, filed on May 18, 2001, now issued as U.S. Pat. No. 7,000,249, on Feb. 14, 2006, the entirety of which is incorporated herein by this reference.

BACKGROUND OF THE INVENTION

1. Field of the Invention

The invention relates to the field of BIOS systems and information card bus architecture in microprocessor-based devices. More particularly, the invention relates to pre-boot enhancement and/or authentication for BIOS applications and systems.

2. Related Prior Art

In microprocessor-based devices, such as stationary desktop computers, laptop computers, personal digital assistants, and/or portable cell phones, a basic input output system (BIOS) is located in memory on the main logic board.

The system BIOS software typically performs a variety of roles in the start-up sequence of a microprocessor-based device and associated hardware, which eventually includes the loading of an operating system for the device. Before the operating system is loaded, the system BIOS manages the start-up of other devices and sub-systems, typically comprising power on self-testing for all of the different hardware components in the system, activating secondary BIOS software located on different installed cards, providing low-level routines that a loaded operating system uses to interface to different hardware devices, such as for keyboards, displays, serial and/or parallel ports, and managing other controllable system parameters.

When a microprocessor-based device is powered on, the system BIOS software, which is typically located on the system logic board for a computer, is activated. During the initial boot-up sequence, the BIOS checks the CMOS Setup, loads interrupt handlers, and then typically determines the operational status of other devices, such as the status of installed cards. Some installed cards have dedicated on-board BIOS software, which initializes on-board memory and microprocessors. For cards which do not have an on-board BIOS software, there is usually card driver information on another ROM on the motherboard, which the main system BIOS loads to perform the boot-up of the attached card.

The system BIOS then checks to see if the computer activation is a cold boot or a reboot, which are often differentiated by the value of a memory address. If the activation is a cold boot, the BIOS verifies the random access memory (RAM), by performing a read/write test of each memory address. The BIOS also checks the ports for external input/output devices, such as for a connected keyboard and for a mouse. The system BIOS then looks outwardly, towards peripheral busses, and to other connected devices.

The system BIOS then attempts to initiate the boot sequence from the first device of one or more bootable devices, which are often arranged in a sequential order. If the system BIOS does not find the first of one or more sequential devices, the BIOS then attempts to find the next device in the sequential order.

If the BIOS does not find the proper files on at least one appropriate bootable device, the startup process halts. If the system BIOS finds the appropriate files on an appropriate bootable device, the system BIOS continues the boot-up operation, thereby loading activating the operating system for the microprocessor-based device.

While some of the system parameter settings which the system BIOS uses during the boot-up sequence can be established or modified by a user, such changes are made after the operating system is presented to a user. For example, on a Macintosh™ computer operating system, by Apple Computer, Inc., of Cupertino, Calif., a user can define one or more system parameters, through control panels, or through enabling or disabling system extensions. While such system changes can be defined by a user, the defined changes are not made until the device is restarted, such that the system BIOS can re-boot the device, and reload the operating system, as defined by the user.

For devices which allow changes to the system BIOS at all, an updating process is required, wherein a user and/or system manager typically installs an updating program. The updating program typically erases the entire system BIOS, and installs the updated system BIOS.

While modifications to a system BIOS are possible for some computer systems, it would be advantageous to provide a modularized BIOS enhancement system, in which external information is accessed before the system BIOS process is completed.

As well, while both hardware and/or software has been used to provide security and authentication systems for microprocessor-based devices, it would be advantageous to provide an authentication system which allows authorized access, while preventing system boot-up to unauthorized users. Such a system would be a major technological breakthrough.

Some microprocessor-based devices, such as desktop computers, use smart cards and associated hardware, as a means to authenticate a user with the device. For example, for a desktop computer having conventional Smart Card Authentication, the desktop computer typically has an attached Smart Card reader. User access to the computer is allowed, if an authorized Smart Card is inserted into the Smart Card reader. While the desktop computer provides authorized access, the computer is required to be booted, i.e. the BIOS process has been completed and the operating system has been loaded, at the time the user is prompted to enter a Smart Card.

In a Windows™ CE based Aero 8000 personal digital assistant (PDA), by Compaq Computer, Inc., an authentication system is provided which does not provide a universal interface with BIOS security authentication. The Aero 8000 PDA system is a "closed-box" embedded system, which includes non-standard firmware code to access a non-PC/SC smart card for BIOS security authentication.

Other microprocessor-based devices, such as portable cell phones, use smart cards and associated hardware, as a means to authenticate a user with the device. Many portable cell phones include a small smart card, which is located internally to the phone, that associates the phone with the host company, as well as with the contracted user. Alternate portable cell phones, such as a V. Series™ V3682 phone, by Motorola, Inc., provide external access for a removable smart SIM card which is associated with a contracted user, such that a portable cell phone may be used for more than one user or account, and such that a user may use other similarly equipped portable cell phones for communications which are associated with the inserted smart card. While such portable cell phones associate smart cards with users and host companies, the operating BIOS processes for such devices phones are unaffected by the smart cards.

Password protection software has also been used to provide security for desktop and portable computing devices. For example, FolderBolt-Pro™, by KentoMarsh Ltd., of Houston, Tex., provides software based security and encryption for files, applications, and/or folders, whereby the user can select varying levels of protection, such as with passwords, before access to the protected file or folder is given. While security software provides some level of protection to a device, such security software operates within a loaded operating system, i.e. the protection software does not authorize or prevent the system BIOS boot up process from being performed.

The disclosed prior art systems and methodologies thus provide basic authentication systems, such as through the use of a smart card, or other memory media storage device, e.g. such as a Memory Stick™, by Sony Electric Company, Inc., to identify a user, once a device has been booted-up. However, the system BIOS for such devices is unaffected, such that the operating system is already loaded, at the time the user is prompted to provide authentication.

It would therefore be advantageous to provide a BIOS-based authentication security enhancement structure and process, whereby the BIOS process is diverted by the security authentication system, such that the system BIOS process is inherently enhanced or halted, based upon the results of the pre-boot system. It would also be advantageous that such a BIOS-based information system be integrated with information contained within removable modules or cards. The development of such a BIOS-based enhancement system would constitute a major technological advance. The development of such a BIOS-based system for authentication would constitute a further technological advance.

SUMMARY OF THE INVENTION

Systems are provided for the enhancement of the system BIOS for microprocessor-based devices. Before the end of a BIOS start-up procedure, the BIOS operation is diverted to a BIOS security authentication system. The BIOS security authentication system establishes communication with an information module, if the information module is present. The information module is typically a removable or installable card, which may be unique to one or more users. Based upon an information exchange between the BIOS security authentication system and the information module, the BIOS security authentication system controllably allows or prevents the completion of the BIOS boot-up procedure. In a preferred embodiment, the BIOS security authentication system is used as a pre-boot authentication system, to prevent a microprocessor based device from booting up unless a valid, authorized information module is present. In other preferred embodiments, an adaptive BIOS security authentication system interface is provided, to allow an information exchange with a variety of information modules, having one or more information formats. In alternate embodiments, information from the information exchange may be transferred to the main system BIOS (such as to provide system functions to the BIOS, or to provide identity information of the user, based upon the information module.

In one embodiment, there is provided a method for enhancing a basic input output system (BIOS) of a computing device during a BIOS procedure, wherein the computing device has an adaptive interface module and the adaptive interface module is capable of communicating with an information module. The BIOS procedure has an interval with a start and a finish. The method includes starting the BIOS procedure, interrupting the BIOS procedure during the interval before the finish, retrieving updated information from the information module, and modifying the BIOS procedure according to the updated information.

In another embodiment, there is provided a system for enhancing a basic input output system (BIOS) of a computing device during a BIOS procedure, wherein the BIOS procedure has an interval with a start and a finish. The system includes a microprocessor-based device and an information module. The microprocessor-based device has an information module reader with an adaptive interface module, a BIOS, and an operating system. The information module can be inserted into the information module reader. The microprocessor-based device is booted through the BIOS procedure; the microprocessor-based device also being capable of interrupting the BIOS procedure, retrieving information from the information module through the information module reader during the BIOS procedure, and altering the BIOS procedure according to the retrieved information.

BRIEF DESCRIPTION OF THE DRAWINGS

FIG. 2 is a schematic diagram of computer system having an integrated BIOS security authentication enhancement system;

FIG. 3 shows a simplified flow structure of a pre-boot authentication system;

FIG. 4 shows a simplified timeline for the flow structure of an integrated BIOS security authentication enhancement system;

FIG. 6 shows exemplary coding for one embodiment of the pre-boot authentication system;

FIG. 7 shows exemplary coding for card bus controller initialization;

FIG. 8 shows coding for card resource reader controller initialization;

FIG. 9 shows coding for card resource insertion detection;

FIG. 10 shows coding for card resource power on and ATR retrieval;

FIG. 11 shows coding for card resource data exchange;

FIG. 12 shows coding for card resource power off;

FIG. 13 shows coding for card resource release;

FIG. 14 shows a first portion of a pre-boot authentication BIOS system specification;

FIG. 15 shows a second portion of a pre-boot authentication BIOS system call specification;

DETAILED DESCRIPTION OF PREFERRED EMBODIMENTS

Figure 1:
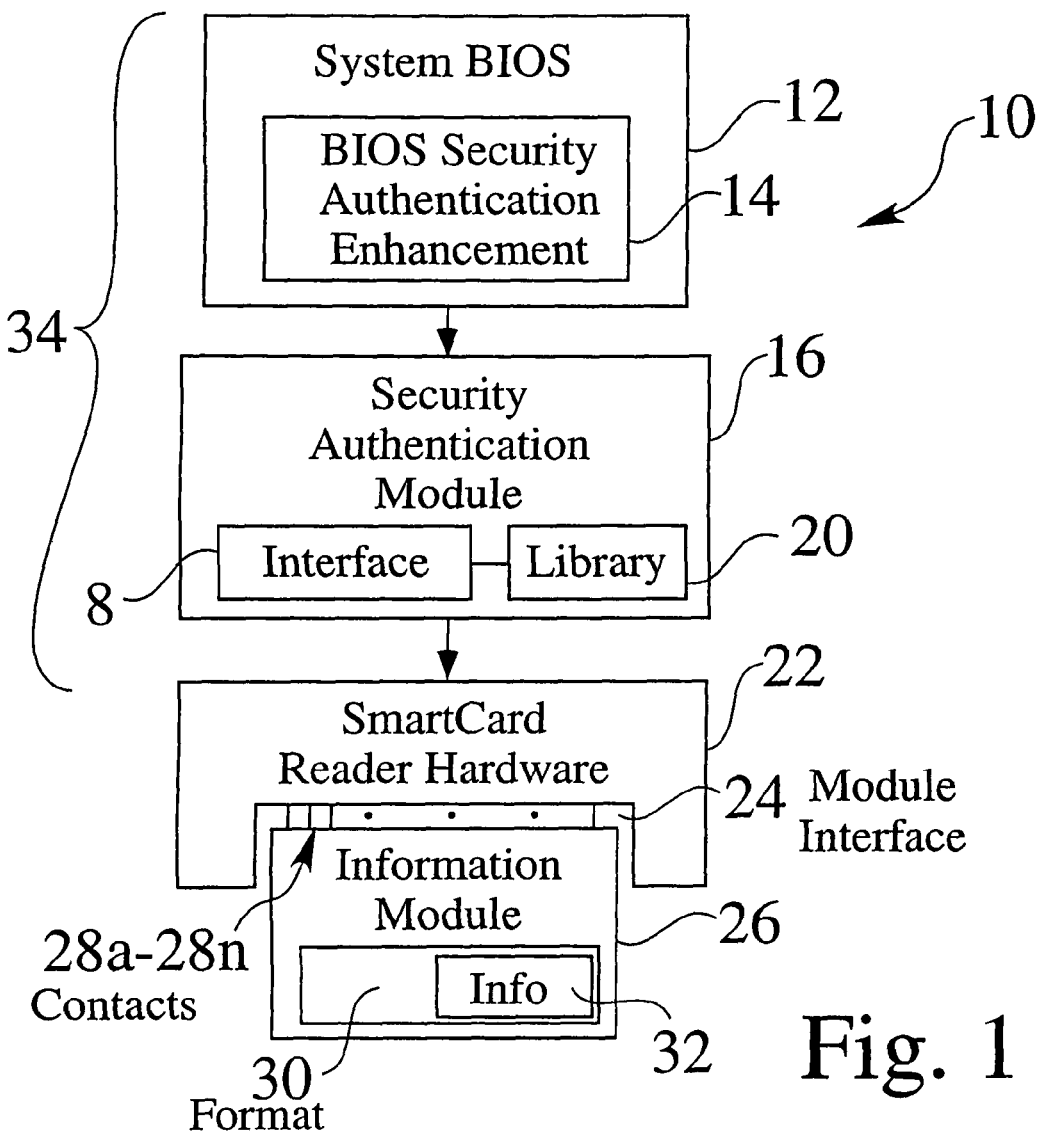
FIG. 1 is a functional block diagram of a pre-boot authentication system integrated with a device having a system BIOS.

FIG. 1 is a functional block diagram of a pre-boot authentication system 10 which is integrated with a microprocessor-based device 34 (FIG. 2, FIG. 7, FIG. 15, FIG. 16, FIG. 17) having a basic input output system (BIOS) 12. The standard system BIOS 12 for the device further comprises a BIOS security authentication enhancement 14, whereby the system BIOS process 12 is diverted to a security authentication module 16 before the end (58)(FIG. 3) of the BIOS process.

As seen in FIG. 1, a security authentication module 16 comprises an interface 18 and a library 20. The security authentication module 16 is also associated with information module reader hardware 22, which comprises a module interface 24 and one or more module contacts 28a-28n. The module interface 24 accepts a removable or installable information module 26. An information module 26 comprises stored information 32, which is typically addressable or available within a defined format 30.

When an information module 26 is installed within the module interface 24 of the reader hardware 22, contacts 28a-28n are established between the information module 26 and the reader hardware 22.

Figure 17:
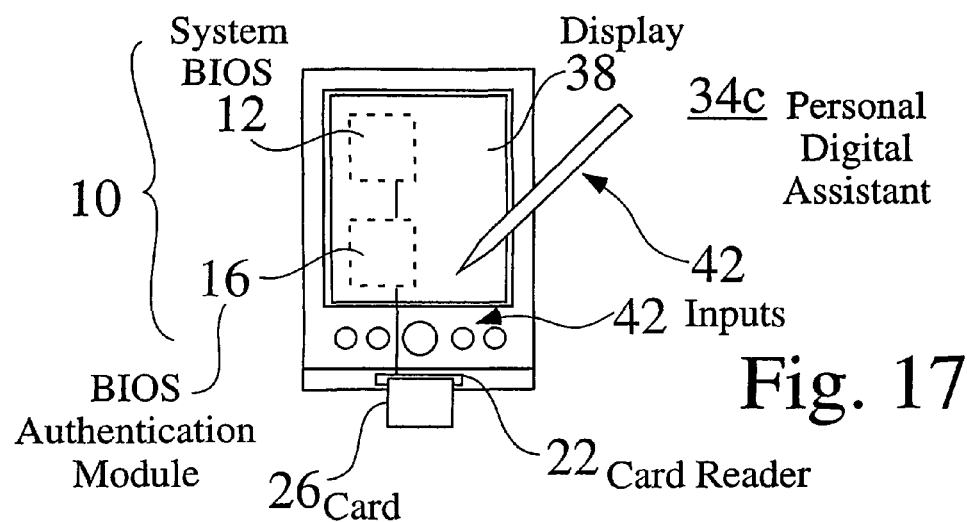
FIG. 17 is a diagram of portable personal digital assistant having an integrated pre-boot BIOS security authentication system.
Figure 18:
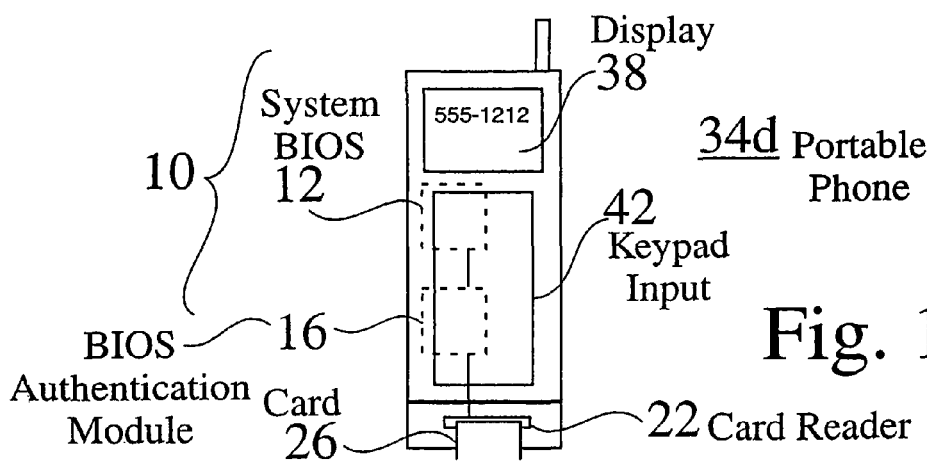
FIG. 18 is a schematic diagram of a portable phone having an integrated pre-boot BIOS security authentication system.

FIG. 2 is a schematic diagram 32 of a microprocessor-based computer 34a, having an integrated pre-boot authentication system 10. While the microprocessor-based device 34a shown in FIG. 2 is illustrated as a desktop computer system 34a, it should be understood that the pre-boot authentication system can be readily applied to a large variety of microprocessor-based devices 34 (FIG. 1), such as portable computers 34b (FIG. 16), personal digital assistants 34c (FIG. 17), and/or cell phones 34c (FIG. 18).

The microprocessor-based computer 34a shown in FIG. 2 comprises a logic board 36, having an associated system BIOS 12, which is integrated 14 with the security authentication module 16. The microprocessor-based computer 34a also typically comprises associated hardware, such as a display 38, input devices, such as a keyboard 40 and mouse 42, and memory storage 44. The security authentication module 16 is connected to a reader 22, which comprises means for connecting to an information module 26.

FIG. 3 shows a simplified flow structure 50 of a pre-boot authentication system 10. When the microprocessor-based device 34 is activated 52, the enhanced basic input output system (BIOS) process 70 (FIG. 5) is started, at step 54. Preliminary BIOS procedures 56 are performed, until the system BIOS 12 is diverted to the security authentication process 60. As seen in FIG. 3, the pre-boot security enhancement process 50 is commonly used for BIOS authentication 60. Based upon a successful authentication 60 within the pre-boot security process 50• the system BIOS 12 is allowed to continue, by performing post-authentication procedures 66, which typically comprises the eventual loading of an operating system, at step 68. As also seen in FIG. 3, the pre-boot security enhanced BIOS process 50 is prevented from performing post-authentication procedures 66 and loading an operating system, if there is no authorization 60, i.e. the micro-processor-based device 34 does not boot-up.

FIG. 4 shows a simplified timeline 70 for the flow structure of an integrated pre-boot security system 10. At time $T_0$, the microprocessor-based device 34 is activated 52, and the basic input output system (BIOS) process 12 is started, at step 54. Preliminary BIOS procedures 56 are performed, until the system BIOS 12 is diverted to the security authentication enhancement process 60, at time $T_1$ 74. Based upon a successful BIOS security authentication enhancement process 60, the system BIOS 12 is allowed to continue, at time $T_2$ 76, in which post-process procedures 66 are controllably allowed to occur. Post-process procedures 66 typically comprise the preparation and loading of an operating system, at step 68, at the end 58 of the system BIOS process 12. As described above, the enhanced BIOS process 50 is prevented from performing post-process procedures 66 and loading an operating system, if the system does not successfully complete the enhancement and/or authentication process 60.

Figure 5:
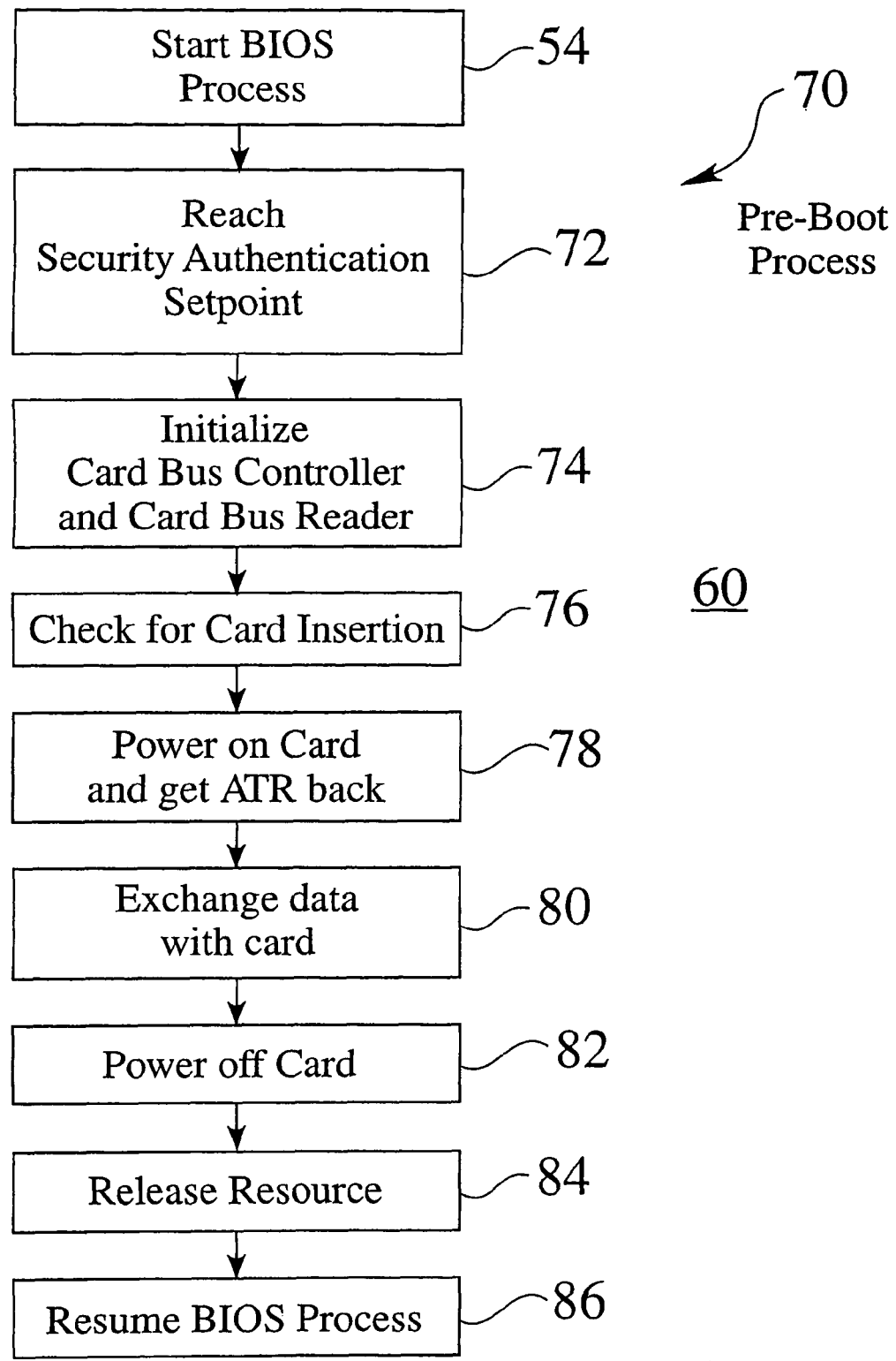
FIG. 5 is a flow chart of one embodiment of the pre-boot authentication system.

FIG. 5 is a flowchart of a typical security authentication BIOS process 70. Once the microprocessor device 34 is activated, the standard BIOS process 12 is enabled, at step 54. The system BIOS 12 continues, until the security authentication set point is reached, at step 72. The card bus controller interface 18 and card bus reader 22 are initialized, at step 74. The controller interface 18 the checks for card insertion into the module interface 24, at step 76. Once an information module card 26 is inserted, the card is powered and the handshaking "answer to reset signal function coding ATR (FIG. 10) is sent from the card 26 and is received by the controller interface 18, at step 78. If an acceptable handshaking answer to reset signal ATR is received, the controller interface 18 exchanges other information with the card 26, e.g. such as authentication information, at step 80. After the data exchange step 80 is finished, the card is powered off, at step 82, and the controller interface 18 releases the reader resource 22, at step 84. Based on a successful pre-boot authentication process 70, the system BIOS is allowed to resume, at step 86, such that the system BIOS process may be completed 58 (FIG. 4).

FIG. 6 shows coding 90, in C programming language, for one embodiment of the pre-boot authentication system 70. FIG. 7 shows coding for card bus controller initialization 74a. FIG. 8 shows coding for card resource reader controller initialization 74b. FIG. 9 shows coding for card resource insertion detection 76. FIG. 10 shows coding for card resource power on and ATR retrieval 78. FIG. 11 shows coding for card resource data exchange 80. FIG. 12 shows coding for card resource power off 12. FIG. 13 shows coding for card resource release 84. FIG. 14 shows a first portion of a pre-boot authentication BIOS system call specification. FIG. 15 shows a second portion of a pre-boot BIOS system call specification.

Pre-Boot BIOS Enhancement for Authentication. As seen In FIG. 3 through FIG. 6, the pre-boot BIOS enhancement system 10 is implemented before the end of the system BIOS 12 for a microprocessor-based device 34. For applications in which the pre-boot BIOS enhancement system provides authentication, based upon the use of information card modules 26 comprising authentication information 32, the microprocessor-based device 34 is prevented from booting up at all, unless a valid information card 26 is inserted into the card reader 22.

The pre-boot BIOS enhancement system 10 is particularly suitable for smart card architectures, whereby the reader 22 and cards 26 are often standardized. The pre-boot BIOS enhancement system 10 checks to see if an inserted smart card 26 is valid, and determines if an inserted smart card 26 has valid function coding. When the device 34 is powered on, the system BIOS process 12 begins. The BIOS process 12 is then interrupted, at which time the pre-boot system BIOS module 16 looks to the authentication card 26, to determine it's presence, and if so, queries the authentication card 26 for information 32. Upon connection with a valid authentication card 26, the enhanced BIOS 12, 14 continues the startup process. If a valid authentication card 26 is not connected, the system BIOS 12 is prevented from continuing, and the operating system for the device 34 is prevented from being loaded, thereby providing robust protection against unauthorized access.

In prior authentication systems, the device system BIOS 12 is initially completed, such that access to further use of some or all computer functions are controlled by an authentication system and associated process. For example, in a conventional desktop card-based security system, the operating system of the device is initialized at the end of the system BIOS process 12, at which point, an authentication system is activated. In a card-based embodiment, when a valid authorization card is entered, authentication system allows entry to the device, such as to applications and files. In a software-based system, when a valid password is entered, the software-based authentication system allows entry to the device. However, in each of these conventional authentication systems, the system BIOS is completed and the operating system is already loaded, such that any bypass of the security structure may yield unauthorized access to an enabled operating system.

In contrast to such conventional authentication systems, which are activated after the system BIOS is completed, the pre-boot authentication system 10 is activated before the system BIOS 12 is completed 58. In a typical embodiment, therefore, the pre-boot authentication system 10 prevents any sort of user interaction through the operating system of a microprocessor-based device 34, until such time that a valid authentication occurs.

Figure 16:
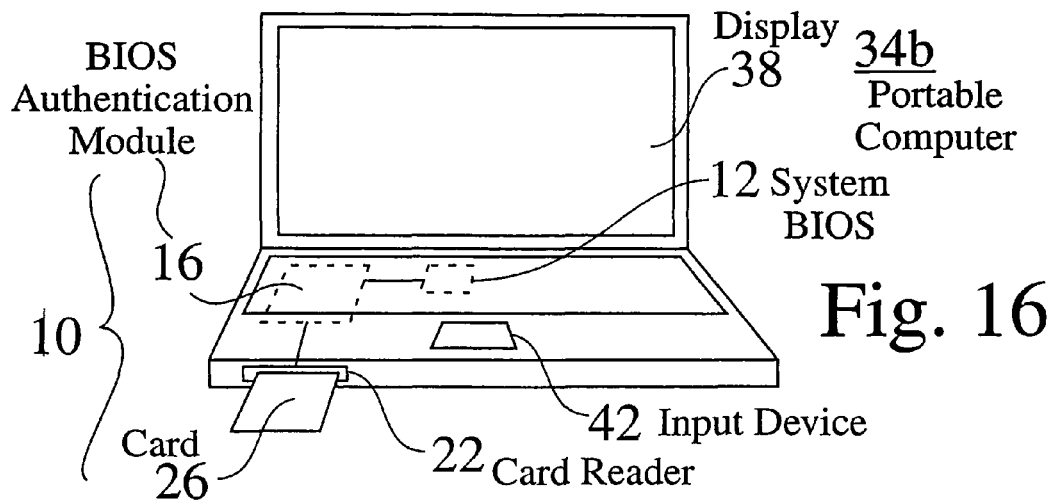
FIG. 16 is a diagram of a portable computer system having an integrated pre-boot BIOS security authentication system.

Pre-Boot Enhancement and Authentication Systems for Portable Devices. FIG. 16 is a diagram of a portable computer system 34b having an integrated pre-boot enhancement or authentication system 10. FIG. 17 is a diagram of a portable personal digital assistant 34c having an integrated pre-boot enhancement or authentication system 10. FIG. 18 is a diagram of a portable phone 34d having an integrated pre-boot enhancement or authentication system 10.

Portable devices are often misplaced, lost, or stolen. The pre-boot system 10 is particularly advantageous for portable devices 34, providing secure access to private information, such as personal and business files and contact information. As the pre-boot system prevents loading of the operating system for a device, the pre-boot system provides a useful deterrent to theft of portable devices; there is no way to recover information through the operation system of the device, and the device provides a greatly diminished value to unauthorized people.

Even for a stationary microprocessor-based device 34 which is located in a large user environment, e.g. such as a large corporation, the pre-boot authentication system 10 prevents access through the operating system of the device, unless proper authentication 60 occurs during the system BIOS process 12.

Alternate Applications for the Pre-boot System. While the pre-boot authentication system 10 is disclosed above as an authentication system, alternate embodiments may provide other enhancements to a system BIOS 12, before the end 58 of a boot-up process for a microprocessor-based device 34. For example, installable or insertable information modules 26 may contain other enhancements for an operating system, or may include preferred system settings for an authorized user, which are activateable or installable before the end 58 of the system BIOS process 12.

For example, the information may preferably comprise coding information which is used to extend or update the system BIOS for a particular device 34. The information module 26 may preferably contain updated or new subroutines for the system BIOS12. Instead of requiring that an new system BIOS 12 be installed, or that an existing BIOS 12 be updated through existing methods, the pre-boot enhancement system 12, as integrated with an information module 26, readily provides upgradeability for a system BIOS 12, such as to work with changing operating system software and/or hardware.

Information Modules. Information modules 26 can be implemented with a wide variety of card and information module formats 30. In a preferred embodiment of the pre-boot BIOS enhancement system 10, the information modules 26a-26n are insertable memory cards, e.g. such as a Smart Card™, by Smart Card Alliance, a Memory Stick™, by Sony Electric Company, Inc., or a Security Device™, by Toshiba Electronics, Inc.

While such information cards 26 often have different information formats 30 (FIG. 1), the physical structure and defined contacts 28a-28n for information cards 26 are often standardized. Therefore, the pre-boot authentication system 10 provides a hardware interface that physically interfaces with a variety of information cards 26a-26n, while providing an adaptive software interface 18, having a plurality of library modules 20a-20n, whereby communication may be established with any of the cards 26a-26n.

Figure 19:
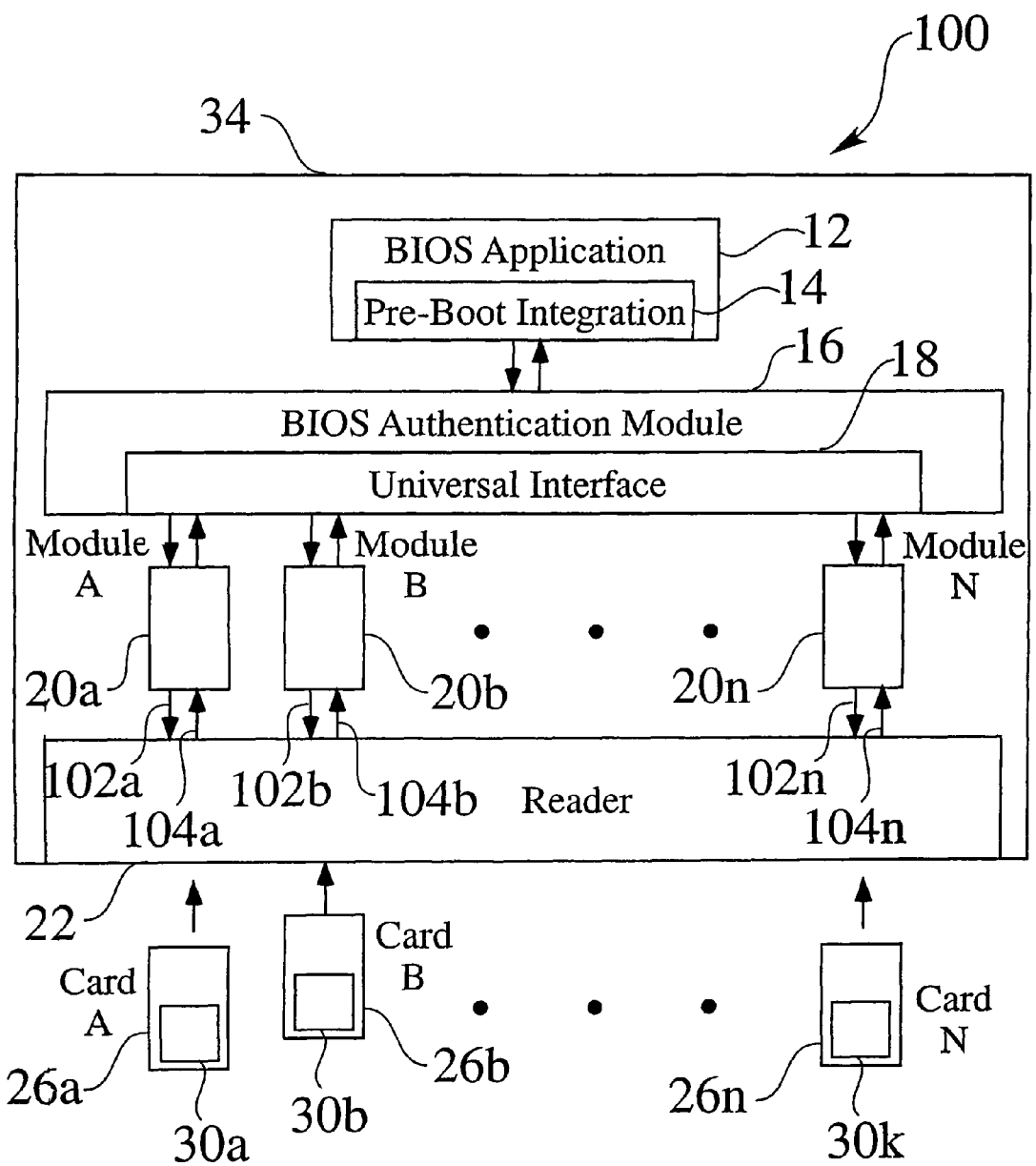
FIG. 19 is a schematic diagram of a preferred embodiment of the pre-boot authentication system, in which the pre-boot interface establishes communication with information modules having one or more formats.

Adaptive Pre-Boot Enhancement and Authentication System. FIG. 19 is a simplified functional block diagram of a preferred embodiment 100 of the pre-boot authentication system 10, in which the pre-boot module 16, having an adaptive interface 18 and a plurality of library modules 20a-20n, establishes communication with information modules 26a-26n having one or more formats 30a-30k, such as for resource (memory and I/O port) management and security management.

The card reader 22 allows the insertion of information modules 26a-26n, based upon a variety of information formats 30a-30k. The adaptive BIOS enhancement module 1:6 comprises a plurality of format library modules 20a-20n, by which the system interface 24 establishes communication with an inserted information module 26.

The system BIOS 12 is integrated with the adaptive pre-boot enhancement system 100, based upon the plurality of installed pre-boot libraries 20a-20n. The pre-boot libraries 20a-20n define the structure by which the BIOS is diverted to the pre-boot enhancement authentication system, and defines the structure by which the system BIOS may resume, based upon a successful data exchange with an acceptable information module 26.

As well, the libraries 20a-20n define the integration of the reader hardware 22 and validation rules for information modules 26. Therefore, the libraries 20a-20n comprise information and communication protocols necessary to establish a communication exchange with the information modules 26a-26n.

During the system BIOS boot-up operation of the device 34 shown in FIG. 19, the system BIOS 12, having pre-boot system integration 14, is diverted to the adaptive pre-boot enhancement system module 16, having an adaptive interface 18. When an information module 26, e.g. such as card 26b having a format 30, e.g. such as format 30b, is inserted within the module reader 22, the adaptive pre-boot module 16 detects the insertion, at step 76 (FIG. 5). The adaptive pre-boot BIOS enhancement module 16 then attempts to establish communication with the information module 26b. In an exemplary embodiment of the process, the adaptive pre-boot BIOS enhancement module 16 iteratively sends a handshake prompt signal 102a-102n to the information module 26, based upon a corresponding appropriate handshake prompt (ATR) signal 102a-102n associated with each of the stored plurality of format library modules 20a-20n. Once the adaptive BIOS enhancement module 16 sends an acceptable handshake prompt ATR signal 102, i.e. one that is recognized by the information module 26, the information module 26 responds by sending a matching handshake return signal 104b. Upon receipt of a matching handshake return signal 104b, which is preferably matched to the stored format library module 20, the adaptive BIOS enhancement module 16 performs the data exchange with the information module 26, within the library format 30 defined by the successful matching handshake pair 102, 104.

The adaptive BIOS enhancement system 100 can therefore distinguish the type of information module 26 which is inserted, and can provide BIOS enhancement, such as authentication, using a variety of information modules 26a-26n, Le. for both standard and nonstandard cards 26. For example, in a large organization environment, the use of a variety of removable authentication cards 26a-26n, having a variety of formats 30a-30k, may be used for authentication purposes.

Even for information cards 26 having synchronous or asynchronous formats 30, the adaptive pre-boot BIOS system 100 can be programmed with corresponding library modules 20a-20n, having appropriate command sets, which correspond to both synchronous or asynchronous formats 30.

As well, a single information module 26, such as a smart card 26 that is unique to a user, may preferably be used to authenticate other microprocessor-based devices 34, either having the pre-boot system 10 which has an appropriate reader 22 and library 20, or having another adaptive BIOS enhancement system 100, provided that the information module comprises appropriate authentication information 32.

Although the pre-boot authentication system and its methods of use are described herein in connection with a personal computers and other microprocessor-based devices, such as the apparatus and techniques can be implemented for a wide variety electronic devices and systems, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A method for enhancing a basic input output system (BIOS) of a computing device during a BIOS procedure, the computing device having an adaptive interface module, the adaptive interface module being capable of communicating with an information module, and the BIOS procedure having an interval with a start and a finish, the method comprising the steps of: starting the BIOS procedure; interrupting the BIOS procedure during the interval before the finish; establishing communication with said information module through said adaptive interface module by exchanging a plurality of signals between said information module and said adaptive interface module;
   determining by said adaptive interface module a data format, within which updated information stored in said information module is addressable and available, according to said plurality of signals;
   retrieving said updated information from the information module according to said data format;
   and modifying the BIOS procedure and updating system settings for an authorized user according to the updated information;
   wherein the steps of establishing communication with said information module through said adaptive interface module by exchanging a plurality of signals between said information module and said adaptive interface module, and determining by said adaptive interface module a data format, within which updated information stored in said information module is addressable and available, according to said plurality of signals, further comprises the steps of:
   sending a handshake prompt signal from said adaptive interface module to said information module;
   if said handshake prompt signal is recognized by said information module, operating the steps of:
   sending a corresponding handshake return signal from said information module to said adaptive interface;
   establishing communication with said information module through said adaptive interface module; and
   determining by said adaptive interface module a data format, within which updated information stored in said information module is addressable and available, according to said handshake prompt signal and said handshake return signal; and if said handshake prompt signal is not recognized by said information module, sending a next handshake prompt signal from said adaptive interface module to said information module; and
   wherein, the steps of sending a handshake prompt signal from said adaptive interface module to said information module and sending a corresponding handshake return signal from said information module to said adaptive interface further comprises the steps of:
   sending said handshake prompt signal from said adaptive interface module to said information module through a corresponding one of a plurality of format library modules coupled to said information module and sending said corresponding handshake return signal from said information module to said adaptive interface through said corresponding format library module.

2. The method of claim 1, wherein the updated information being capable of modifying the BIOS procedure.

3. The method of claim 1, wherein the updated information further comprising new subroutines for the BIOS.

4. The method of claim 1, wherein the updated information being capable of modifying an operating system for the computing device.

5. The method of claim 1, further comprising the step of:
   commencing said BIOS procedure after the step of modifying the BIOS procedure and updating the system settings.

6. A system for enhancing a basic input output system (BIOS) of a computing device during a BIOS procedure, the BIOS procedure having an interval with a start and a finish, the system comprising:
   a microprocessor-based device, the microprocessor-based device having an information module reader with an adaptive interface module, a BIOS, and an operating system; and
   an information module capable of being inserted into the information module reader, wherein the microprocessor-based device being booted through the BIOS procedure, the microprocessor-based device also being capable of: interrupting the BIOS procedure between start and finish;
   establishing communication between said information module and said adaptive interface module by exchanging a plurality of signals between said information module and said adaptive interface module through said information module reader, determining by said adaptive interface module a data format, within which updated information stored in said information module is addressable and available, according to said plurality of signals, retrieving said updated information from the information module through the information module reader according to said data format, and altering the BIOS procedure and updating system settings for an authorized user according to the retrieved information;

wherein the steps of establishing communication with said information module through said adaptive interface module by exchanging a plurality of signals between said information module and said adaptive interface module, and determining by said adaptive interface module a data format, within which updated information stored in said information module is addressable and available, according to said plurality of signals, further comprises the steps of:

sending a handshake prompt signal from said adaptive interface module to said information module;

if said handshake prompt signal is recognized by said information module, operating the steps of:

sending a corresponding handshake return signal from said information module to said adaptive interface;

establishing communication with said information module through said adaptive interface module; and determining by said adaptive interface module a data format, within which updated information stored in said information module is addressable and available, according to said handshake prompt signal and said handshake return signal; and if said handshake prompt signal is not recognized by said information module, sending a next handshake prompt signal from said adaptive interface module to said information module; and wherein, the steps of sending a handshake prompt signal from said adaptive interface module to said information module and sending a corresponding handshake return signal from said information module to said adaptive interface further comprises the steps of:

sending said handshake prompt signal from said adaptive interface module to said information module through a corresponding one of a plurality of format library modules coupled to said information module and sending said corresponding handshake return signal from said information module to said adaptive interface through said corresponding format library module.

7. The system of claim 6, wherein the retrieved information being subroutines for the BIOS.

8. The system of claim 6, wherein the retrieved information being capable of modifying the operating system of the microprocessor-based device.

9. The system of claim 6, wherein said microprocessor-based device is further capable of commencing said BIOS procedure after altering the BIOS procedure and updating the system settings.

* * * * *